(12) United States Patent
Gaudreau, Jr.

(10) Patent No.: US 9,022,471 B2
(45) Date of Patent: May 5, 2015

(54) HEADREST FOR JUVENILE VEHICLE SEAT (75) Inventor: Paul D. Gaudreau, Jr., Indianapolis, IN (US)

(73) Assignee: Cosco Management, Inc., Wilmington, DE (US)

( * ) Notice: Subject to any disclaimer, the term of this patent is extended or adjusted under 35 U.S.C. 154(b) by 584 days.

(21) Appl. No.: 13/315,035

(22) Filed: Dec. 8, 2011

(65) Prior Publication Data
US 2012/0175921 A1  Jul. 12, 2012

Related U.S. Application Data (60) Provisional application No. 61/430,872, filed on Jan. 7, 2011.

(51) Int. Cl.
  *A47C 1/08* (2006.01)
  *B60N 2/28* (2006.01)
  *B60N 3/10* (2006.01)

(52) U.S. Cl.
  CPC .............. *B60N 2/2812* (2013.01); *B60N 3/101* (2013.01); *B60N 2/2851* (2013.01); *B60N 2/2872* (2013.01); *B60N 2/2881* (2013.01); *B60N 2/2884* (2013.01)

(58) Field of Classification Search
  CPC ........................... B60N 2/2812; B60N 2/2851
  USPC .................. 297/216.11, 250.1, 410, 467, 484
  See application file for complete search history.

(56) References Cited

U.S. PATENT DOCUMENTS

| | | | |
|---|---|---|---|
| 3,992,056 A | 11/1976 | Koziatek et al. | |
| 4,033,622 A | 7/1977 | Boudreau | |
| 4,183,580 A | 1/1980 | Johansson | |
| 4,613,188 A | 9/1986 | Tsuge et al. | |
| 4,632,456 A | 12/1986 | Kassai | |
| 5,082,325 A | 1/1992 | Sedlack | |
| 5,366,271 A | 11/1994 | Johnston et al. | |
| 5,468,046 A | 11/1995 | Weber et al. | |
| 6,338,529 B1 | 1/2002 | David et al. | |
| 6,398,302 B1 | 6/2002 | Freedman et al. | |
| 6,491,348 B1 * | 12/2002 | Kain | 297/484 |
| 6,764,135 B2 | 7/2004 | Sasaki et al. | |
| 6,808,232 B2 | 10/2004 | Takizawa | |
| 6,817,673 B2 | 11/2004 | Walker et al. | |
| 7,021,710 B2 * | 4/2006 | Kain et al. | 297/256.11 |
| 7,086,695 B2 * | 8/2006 | Hosoya | 297/256.16 |
| 7,246,854 B2 * | 7/2007 | Dingman et al. | 297/250.1 |
| 7,322,647 B2 * | 1/2008 | Munn et al. | 297/250.1 |
| 7,344,192 B2 | 3/2008 | Kespohl | |
| 7,370,912 B2 * | 5/2008 | Williams et al. | 297/256.11 |
| 7,380,878 B2 | 6/2008 | Clement et al. | |
| 7,467,824 B2 | 12/2008 | Nakhla et al. | |
| 7,472,952 B2 | 1/2009 | Nakhla et al. | |
| 7,475,941 B2 | 1/2009 | Clement et al. | |
| 7,862,117 B2 * | 1/2011 | Hutchinson et al. | 297/256.1 |
| 8,141,951 B2 * | 3/2012 | Chen | 297/256.11 |
| 8,585,138 B2 * | 11/2013 | Gaudreau, Jr. | 297/216.11 |
| 8,622,476 B2 * | 1/2014 | Karremans et al. | 297/410 |
| 2002/0145318 A1 * | 10/2002 | Asbach et al. | 297/250.1 |
| 2005/0110315 A1 | 5/2005 | Littlehorn et al. | |
| 2006/0006712 A1 | 1/2006 | Clement et al. | |
| 2007/0284925 A1 * | 12/2007 | Balensiefer | 297/256.11 |
| 2009/0200842 A1 | 8/2009 | Goldberg et al. | |
| 2012/0098309 A1 * | 4/2012 | Gaudreau et al. | 297/256.11 |
| 2012/0146369 A1 * | 6/2012 | Gaudreau, Jr. | 297/216.11 |
| 2012/0153690 A1 * | 6/2012 | Gaudreau, Jr. | 297/250.1 |

* cited by examiner

*Primary Examiner* — Laurie Cranmer
(74) *Attorney, Agent, or Firm* — Barnes & Thornburg LLP (57) ABSTRACT

A child restraint includes a juvenile seat and a child-restraint harness coupled to the juvenile seat. The child restraint also includes a headrest mounted for up-and-down movement relative to a seat back included in the juvenile seat.

21 Claims, 8 Drawing Sheets

HEADREST FOR JUVENILE VEHICLE SEAT

PRIORITY

This application claims priority under 35 U.S.C. §119(e) to U.S. Provisional Application Ser. No. 61/430,872, filed Jan. 7, 2011, which is expressly incorporated by reference herein.

BACKGROUND

The present disclosure relates to child restraints, and in particular, to juvenile seats for use on passenger seats in vehicles. More particularly, the present disclosure relates to a headrest mounted for movement on a juvenile seat.

SUMMARY

According to the present disclosure, a child restraint includes a juvenile seat and a child-restraint harness coupled to the juvenile seat. The juvenile seat includes a seat shell formed to include a seat bottom and a seat back extending upwardly from the seat bottom. The child restraint also includes a headrest mounted for up-and-down movement relative to the seat back.

In illustrative embodiments, the headrest includes a head cradle located on a front side of the seat back above the seat bottom to receive the head of a child seated in the juvenile seat. The headrest also includes a slidable cradle retainer located on an opposite rear side of the seat back and coupled to the head cradle to move therewith during up-and-down movement of the headrest relative to the seat back. In illustrative embodiments, the head cradle is hollow.

In illustrative embodiments, the hollow head cradle includes outer and inner shells that mate to form an interior region therebetween. This interior region is substantially empty to free the outer and inner shells to move toward and relative to one another during exposure of the hollow head cradle to an external impact force. Such relative movement minimizes loads applied by the head cradle to the head of a child that is seated and restrained in the juvenile seat.

In illustrative embodiments, the child restraint further includes a headrest-height controller including a headrest lock located outside of the hollow chamber and an actuator that is arranged to extend into and through the hollow chamber formed in the headrest to mate with the headrest lock. The actuator is configured to provide means for moving the headrest lock between a locked position engaging the juvenile seat to block movement of the headrest relative to the juvenile seat and an unlocked position disengaging the juvenile seat to free the headrest for movement relative to the juvenile seat in response to application of a pushing force by a caregiver to a portion of the actuator located outside of the hollow chamber formed in the headrest.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 4-7 suggest an illustrative series of steps by which a caregiver may change the vertical position of the headrest relative to the seat back of the juvenile seat using the actuator included in the headrest-height controller;

DETAILED DESCRIPTION

Figure 1:
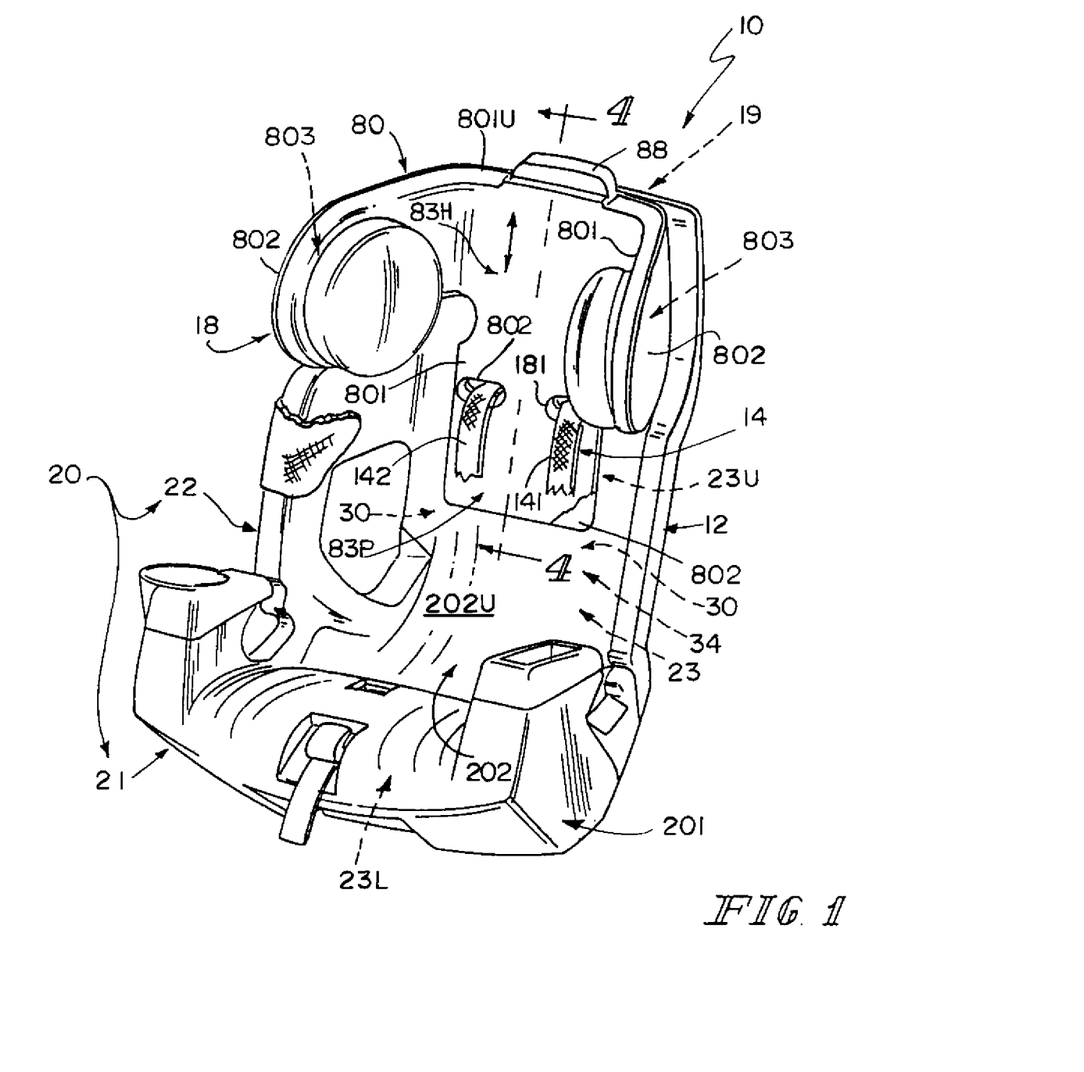
FIG. 1 is a perspective view of a child restraint in accordance with the present disclosure for use on a passenger seat in a vehicle, with portions of a fabric covering broken away, showing a juvenile seat comprising a hollow seat shell including a seat bottom and a seat back extending upwardly from the seat bottom and portions of first and second shoulder belts included in a child-restraint harness coupled to the juvenile seat and also showing a hollow head cradle included in a headrest mounted for up-and-down movement on the seat back under the control of the headrest-height controller that is shown illustratively in FIG. 3B and in operation in FIGS. 4-7.

An illustrative child restraint 10 comprises juvenile seat 12 and a child-restraint harness 14 coupled to juvenile seat 12 and provided with first and second shoulder belts 141, 142 as suggested in FIG. 1. A headrest 18 included in juvenile seat 12 includes a head cradle 80 mounted for up-and-down movement on a seat back 22 also included in juvenile seat 12 as suggested in FIG. 1. Head cradle 80 is hollow and includes outer and inner shells 801, 802 that cooperate to define an interior region 803 of head cradle 80 that is mostly empty as suggested in FIG. 2A. Outer and inner shells 801, 802 are configured and arranged to move toward and relative to one another during exposure of hollow head cradle 80 to an external impact force to minimize any load applied by head cradle 80 to the head of a child seated and restrained in juvenile seat 12.

Figure 2:
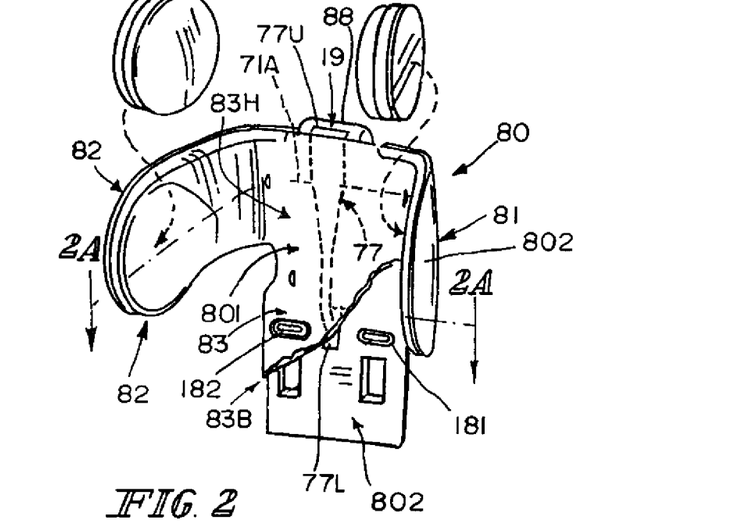
FIG. 2 is a perspective view of components included in the headrest shown in FIG. 1 with a portion of an outer plate of the head cradle broken away to reveal a portion of an inner plate of the head cradle.
Figure 2A:
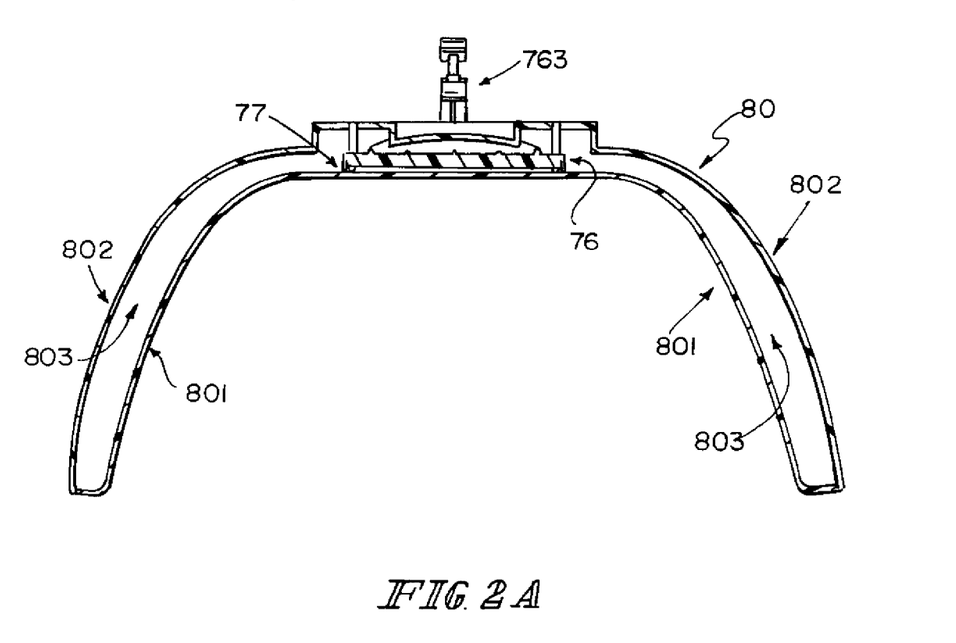
FIG. 2A is an enlarged transverse sectional view taken along line 2A-2A of FIG. 2 showing that the head cradle included in the headrest is hollow and includes an interior region that is substantially empty except for a pivotable hand-operated (lock) release lever included in an illustrative headrest-height controller shown, for example, in FIGS. 3A, 3B, and 4.
Figure 3A:
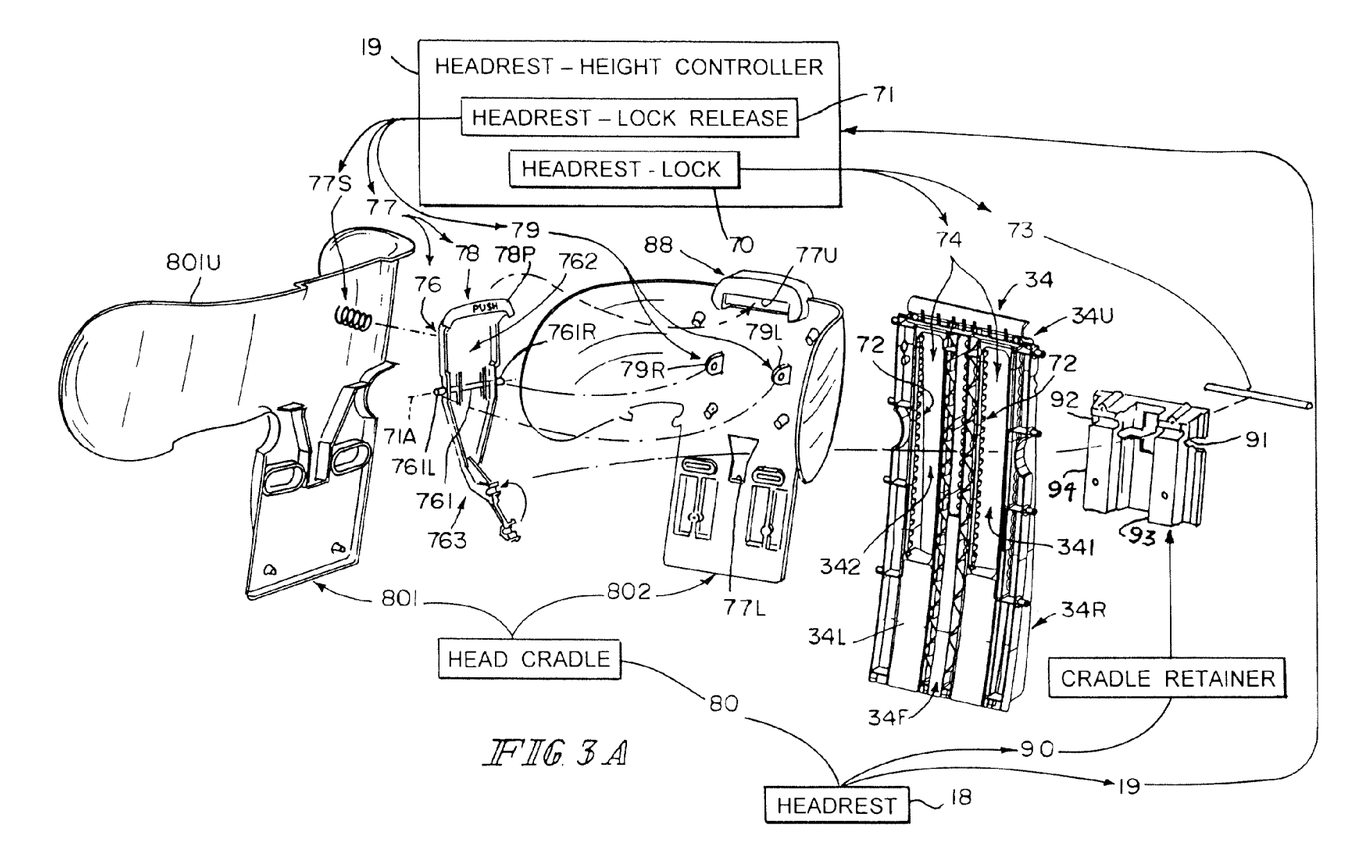
FIG. 3A is an enlarged exploded perspective assembly view showing the separated outer and inner plates included in the head cradle and showing that the headrest-height controller includes a headrest lock and a headrest-lock release including several components positioned to lie between the outer and inner plates included in the head cradle and a portion of a rigidifying truss associated with the hollow seat shell and arranged to lie between the inner plate of the head cradle and the cradle retainer.

Headrest 18 also includes a cradle retainer 90 and a headrest-height controller 19 as suggested in FIG. 3A. An exploded perspective assembly view provided in FIG. 3A shows the separated outer and inner shells 801, 802 before they are mated to one another to form the hollow head cradle 80 shown in FIGS. 2 and 2A. As suggested in FIGS. 2, 2A, and 3A, in illustrative embodiments, interior region 803 of hollow head cradle 80 is substantially empty except for portions of a pivotable hand-operated (lock) release lever 76 included in an actuator 77 provided in headrest-height controller 19.

In illustrative embodiments, juvenile seat 12 includes hollow seat shell 20 comprising a seat bottom 21 and a seat back 22 extending upwardly from seat bottom 21 as shown, for example, in FIG. 1. A rigidifying truss 30 is located inside hollow seat shell 20 as suggested illustratively in FIGS. 1 and 4. Rigidifying truss 30 is configured to mate with and rigidify hollow seat shell 20 and, in illustrative embodiments, includes an upper (beam) stabilizer 34 located in an interior region formed in hollow seat back 22.

Headrest 18 is coupled to child-restraint harness 14 and mounted for up-and-down movement on rigidifying truss 30 and relative to seat shell 20 at the option of a caregiver in an illustrative embodiment as suggested in FIGS. 4-7. Headrest 18 is coupled to first and second shoulder belts 141, 142 of child-restraint harness 14 as suggested in FIG. 1.

Cradle retainer 90 is configured to mate with and slide on load-receiver rails included in upper stabilizer 34 and to support head cradle 80 so that head cradle 80 moves up and down relative to sent bottom 21 whenever cradle retainer 90 moves up and down relative to seat back 22 as suggested in FIGS. 4-7. Head cradle 80 moves up and down along a front face 34F of upper stabilizer 34 while cradle retainer 90 is tethered to head cradle 80 for up-and-down movement along a rear face 34R of upper stabilizer 34 as suggested in FIG. 3A.

Headrest-height controller 19 is coupled to head cradle 80 to move up and down therewith relative to seat back 22 as shown illustratively in FIGS. 3A and 4-7. In illustrative embodiments, headrest-height controller 19 includes a headrest lock 70 including a headrest-retainer rod 73 located outside of interior region 803 of hollow head cradle 80 and a headrest-lock release 71 including an actuator 77 that is arranged to extend into and through interior region 803 of hollow head cradle 80 and mate with headrest-retainer rod 73 at a location outside of interior region 803 of hollow head cradle 80. A caregiver can move (e.g., pivot) actuator 77 to move headrest-retainer rod 73 relative to rigidifying truss 30 and seat back 22 between locked and unlocked positions.

Figure 3B:
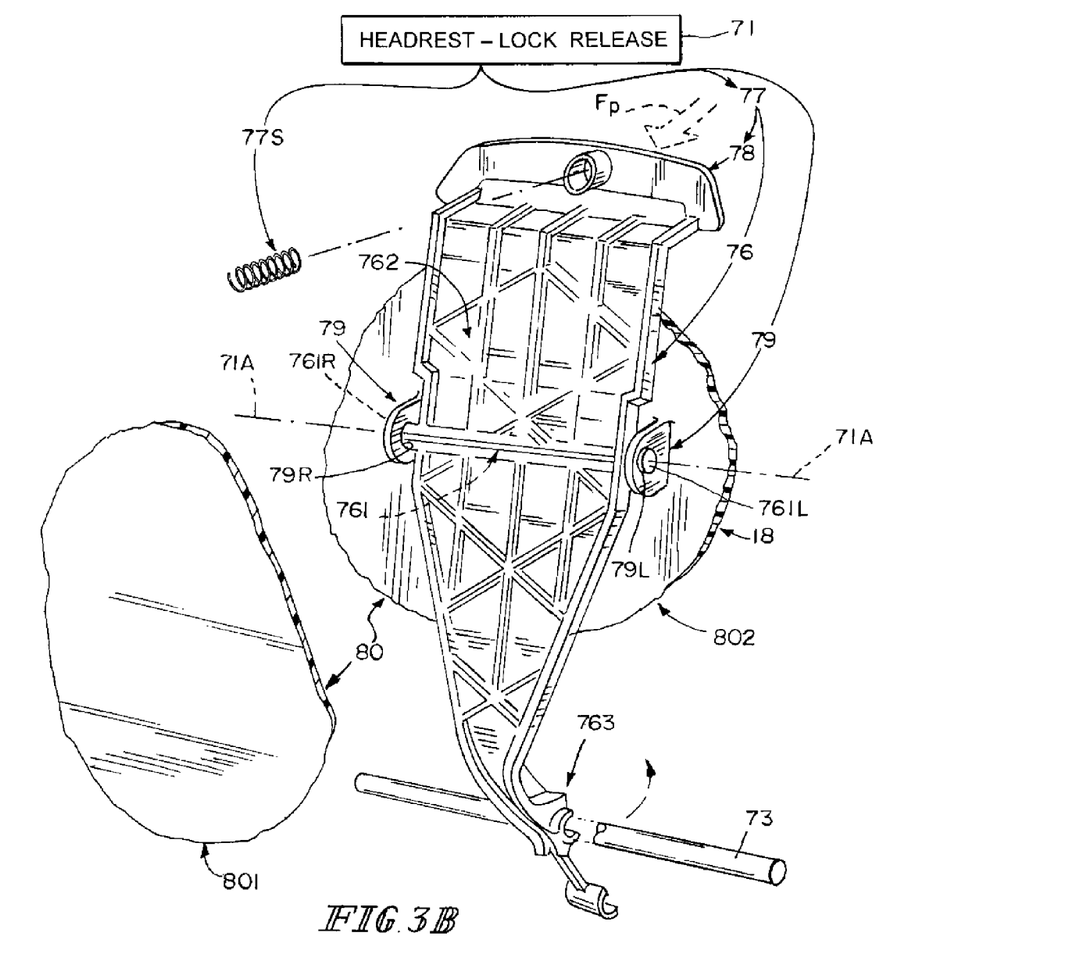
FIG. 3B is an enlarged perspective view of components included in the headrest-lock release showing that an actuator included in the headrest-lock release includes a PUSH handle and a release lever arranged to extend downwardly from the PUSH handle to mate with a headrest-retainer rod included in the headrest lock and adapted to be mounted for pivotable movement on a pivot mount coupled to the inner plate of the head cradle to move the headrest-retainer rod relative to rod-receiving notches formed in notched plates coupled to rigidifying truss as suggested in FIGS. 4-7.
Figures 4, 5, 5A:
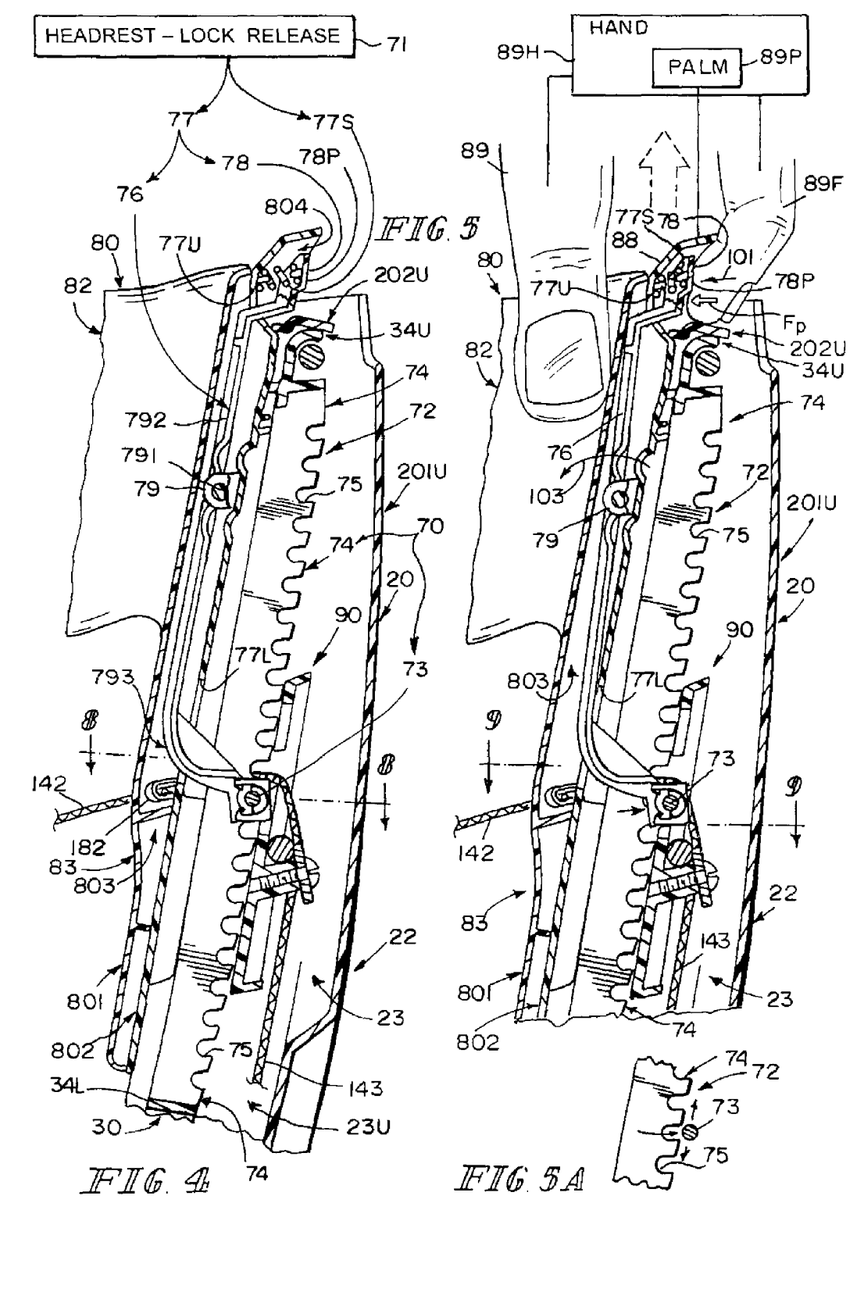
FIG. 4 is an enlarged sectional view taken along line 4-4 of FIG. 1 showing the position of the headrest in a lowered position and showing that the headrest-retainer rod coupled to the lower end of the release lever is engaged in a rod-receiving notch formed in a notched plate (to establish a rod receiver) coupled to the rigidifying truss to retain the headrest in the lowered position and thereby block up-and-down movement of the headrest relative to the seat back.
FIG. 5 is a view similar to FIG. 4 showing a hand of a caregiver applying a push force in a forward direction (to the left) to the PUSH handle to pivot the release lever in a counterclockwise direction about a pivot axis established by the pivot mount to cause the headrest-retainer rod to move out of engagement with the rod-receiving notch to establish a disengaged position of the headrest-retainer rod.
FIG. 5A is a portion of the view shown in FIG. 5 showing that the headrest-rod retainer is in the disengaged position and free to move up and down relative to the notched plate coupled to the rigidifying truss.

Actuator 77 of headrest-lock release 71 includes a PUSH handle 78 and a release lever 76 as suggested in FIGS. 3A, 3B, and 4. Release lever 76 is mounted on an actuator support 79 located in interior region 803 and coupled to headrest 18 for pivotable movement about a pivot axis 71A as suggested in FIGS. 3A and 3B in response to application of a pushing force $F_p$ by a caregiver 89 to PUSH handle 78 to cause movement of a headrest-retainer rod 73 into and out of a rod receiver 72 coupled, for example, to rigidifying truss 30 as suggested in FIGS. 4, 5, and 5A to free headrest 18 for up-and-down movement on rigidifying truss 30 and relative to a seat back 22 included in hollow seat shell 20 as suggested in FIGS. 4-7.

Hollow seat shell 20 includes a seat bottom 21 and a seat back 22 extending upwardly from seat bottom 21 as shown, for example, in FIG. 1. Seat back 22 cooperates with seat bottom 21 to define an interior region 23 containing rigidifying truss 30 as suggested in FIG. 1. Rigidifying truss 30 is coupled to seat bottom and back 21, 22 to lie in a stationary position in interior region 23 of hollow seat shell 20.

Figure 7:
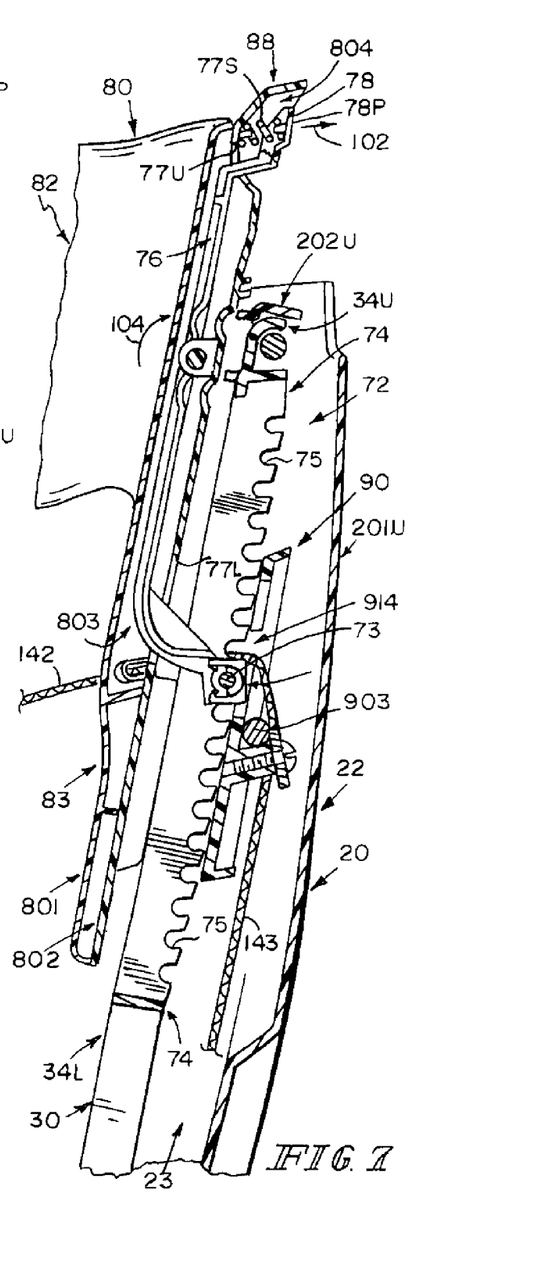
FIG. 7 is a view similar to FIG. 6 showing the headrest in a raised position and showing that the hand of the caregiver has been removed from the release lever to allow a return spring included in the headrest-lock release and coupled to the PUSH handle to pivot the release lever about the pivot axis in a clockwise direction to urge the headrest-retainer rod into contact with the rod-receiving notches formed in the notched plates coupled to the rigidifying truss to establish a normally engaged position of the headrest-retainer rod and thereby block up-and-down movement of the headrest on the rigidifying truss relative to the seat back.
Figure 8:
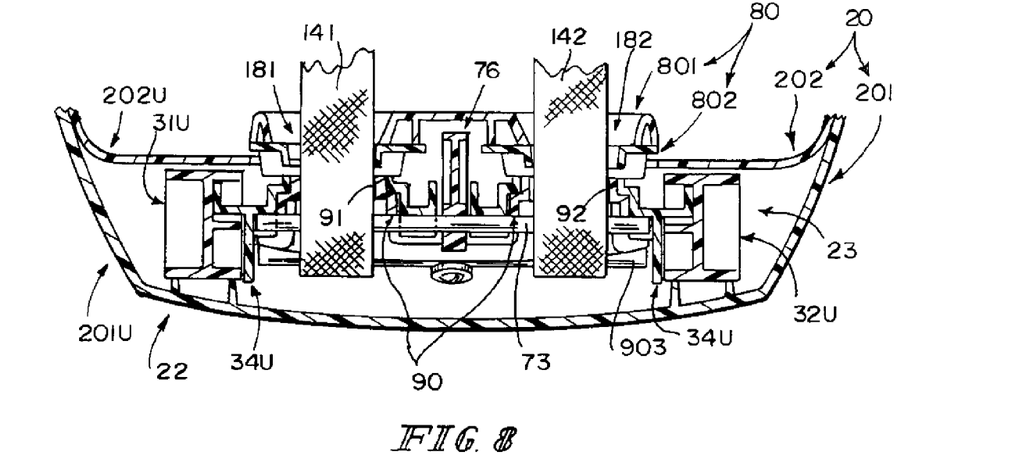
FIG. 8 is a sectional view taken along line 8-8 of FIG. 4 showing the headrest-retainer rod in the normally engaged position.
Figure 9:
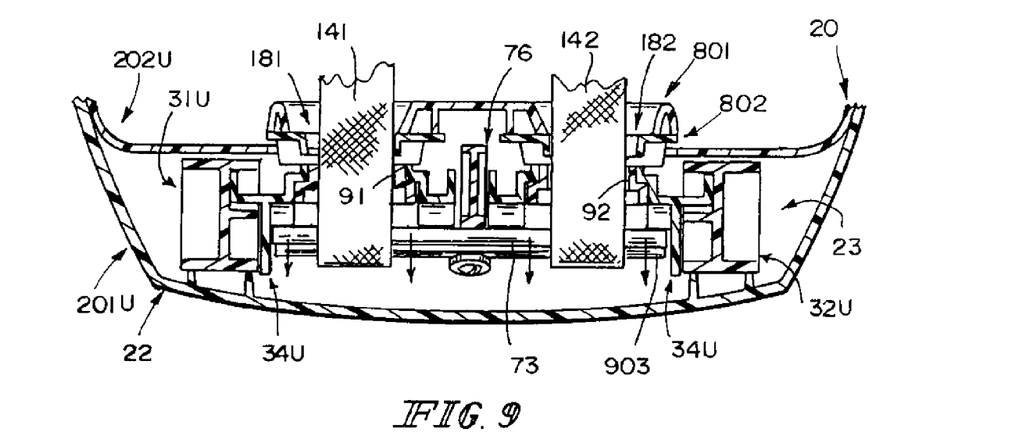
FIG. 9 is a sectional view taken along line 9-9 of FIG. 5 showing the headrest-retainer rod in the disengaged position.

In illustrative embodiments, headrest 18 is coupled to upper stabilizer 34 of rigidifying truss 30 having first stiffener beam 31 U and second stiffener beam 32 U as suggested in FIG. 3A and FIGS. 8 and 9. Headrest 18 is mounted for up-and-down movement on upper stabilizer 34 at the option of a caregiver 89 operating headrest-height controller 19 as suggested in FIGS. 4-7.

Head cradle 80 of headrest 18 comprises an inner shell 802 and an outer shell 801 as shown, for example, in FIGS. 2A and 3A. Inner shell 802 is located alongside a front face of upper stabilizer 34 of rigidifying truss 30 as suggested in FIG. 3A. Outer shell 801 is arranged to lie in spaced-apart relation to upper stabilizer 34 of rigidifying truss 30 to locate inner shell 802 therebetween as also suggested in FIGS. 3A and 4.

Cradle retainer 90 of headrest 18 is mounted for up-and-down sliding movement on rear face 34R of upper stabilizer 34 of rigidifying truss 30 during movement of headrest 18 relative to seat shell 20 along front face 34F of upper stabilizer 34 under the control of headrest-height controller 19 as shown, for example, in FIGS. 4-7. Slidable cradle retainer 90 is configured to be mounted on a rearwardly facing surface 34R of upper stabilizer 34 of rigidifying truss 30 to place load-transfer flanges included in cradle retainer 90 in mating engagement with companion load-receiver rails included in upper stabilizer 34. Cradle retainer 90 is also fastened to the head cradle 80 to move up and down therewith relative to upper stabilizer 34 and to seat back 22 of hollow seat shell 20 as suggested in FIGS. 4-7. Cradle retainer 90 is also coupled to first and second shoulder belts 141, 142 included in a child-restraint harness 14 included in child restraint 10 and used to restrain a child sitting on seat shell 20.

Headrest-height controller 19 includes a headrest lock 70 and a headrest-lock release 71 in an illustrative embodiment as suggested in FIG. 3A. A caregiver can operate headrest-height controller 19 as suggested in FIGS. 4-7 to lock headrest 18 to upper stabilizer 34 of rigidifying truss 30 in a selected elevated position on seat back 22 or unlock headrest 18 to disengage upper stabilizer 34 so that headrest 18 can be moved up or down on seat back 22 to a new selected elevated position.

Headrest lock 70 includes a rod receiver 72 and a headrest-retainer rod 73 as suggested in FIG. 3A. Rod receiver 72 is coupled to upper stabilizer 34 as suggested in FIG. 3A. In illustrative embodiments, rod receiver 72 comprises several rearwardly extending notched plates 74 coupled to upper stabilizer 34 and formed to include rod-receiving notches 75 as suggested in FIGS. 3A and 4. Each rod-receiving notch 75 is sized to receive headrest-retainer rod 73 therein as suggested in FIG. 5A. In illustrative embodiments, movable headrest-retainer rod 73 and notched plates 74 cooperate to define a headrest lock 70 included in headrest-height controller 19.

Headrest-lock release 71 is configured to interact with headrest lock 70 to free head cradle 80 and cradle retainer 90 to be moved (as a unit) up and down on upper stabilizer 34 of rigidifying truss 30 and relative to seat back 22 by a caregiver 89 as suggested in FIGS. 4-7. In illustrative embodiments, headrest-lock release 71 includes PUSH handle 78 and release lever 76 as suggested in FIGS. 3A and 3B. Release lever 76 is mounted on actuator support 70 for pivotable movement about pivot axis 71A and is coupled to headrest-retainer rod 73 of headrest lock 70 as suggested in FIGS. 3A and 3B. In use, a caregiver 89 can pivot release lever 76 about pivot axis 71A to cause headrest-retainer rod 73 to move relative to upper stabilizer 34 and either engage or disengage rod receiver 72 (e.g., rod-receiving notches 75) in notched plate(s) 74 as suggested in FIGS. 4-7.

An illustrative series of steps by which a caregiver 89 may change the vertical position of the head cradle 80 and cradle retainer 90 relative to seat back 22 of juvenile seat 12 using actuator 77 included in headrest-height controller 19 is suggested in FIGS. 4-7. In use, cradle retainer 90 of headrest 18 rides up and down on rear face 34R of upper stabilizer 34 of rigidifying truss 30 to cause head cradle 80 of headrest 18 to move up and down along seat back 22 relative to seat bottom 21. Caregiver 89 can push inwardly on PUSH handle 78 of actuator 77 to unlock headrest lock 70 in headrest-height controller 19 and then lift or lower head cradle 80 of headrest 18 to change the vertical position of head cradle 80 along seat back 22.

Headrest 18 is shown in a lowered position on seat back 22 in FIG. 4. Headrest-retainer rod 73 is coupled to the lower end of the release lever 76 included in actuator 77 and is engaged in a rod-receiving notch 75 formed in a notched plate 74 coupled to upper stabilizer 34 to retain headrest 18 in the lowered position and thereby block up-and-down movement of headrest 18 relative to seat back 22.

As suggested in FIG. 5, a hand 89H of a caregiver 89 applies a push force $F_P$ in a forward direction 101 (to the left) to PUSH handle 78 to pivot release lever 76 in a counterclockwise direction 103 about pivot axis 71A established by actuator support 79 to cause headrest-retainer rod 73 to move out of engagement with rod-receiving notch 75 included in notched plate 74 to establish a disengaged position of headrest-retainer rod 73. As suggested in FIG. 5A, headrest-rod retainer 73 is in the disengaged position and free to move up and down relative to notched plate 74 coupled to upper stabilizer 34.

Figure 6:
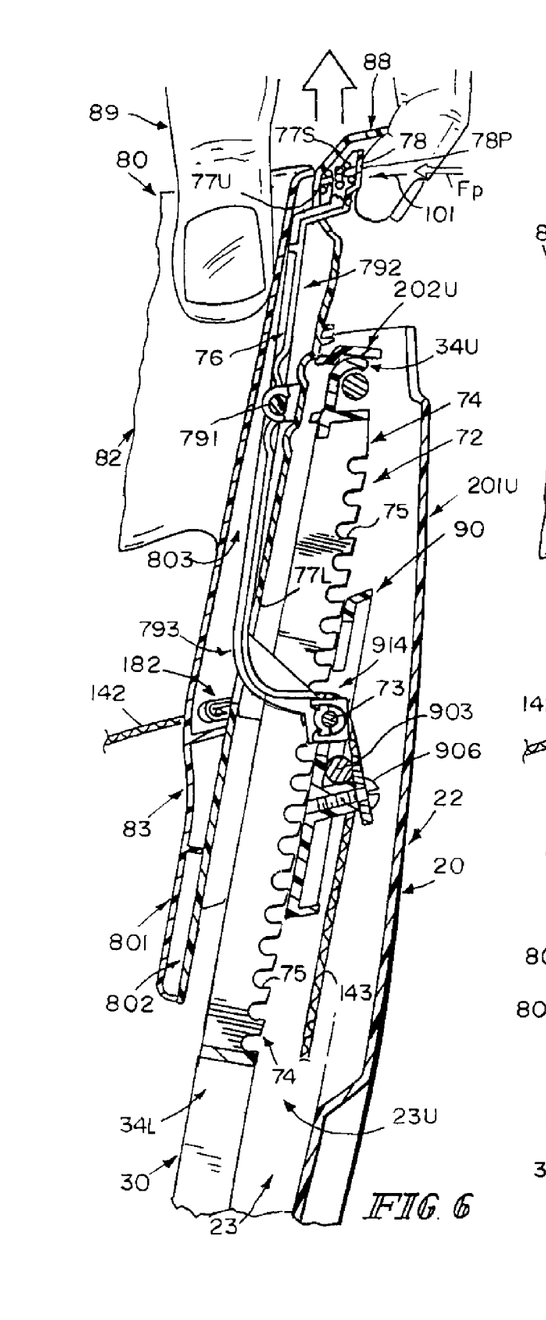
FIG. 6 is a view similar to FIG. 5 showing the hand of the caregiver still applying the push force in the forward direction to the PUSH release lever keeping the headrest-retainer rod in the disengaged position throughout upward movement of the headrest to a raised position.

As suggested in FIG. 6, the hand 89H of the caregiver 89 still applies the push force $F_P$ in forward direction 101 to PUSH handle 78 to pivot release lever 76 to keep headrest-retainer rod 73 in the disengaged position throughout upward movement of movable headrest 18 along seat back 22 to a raised position. The caregiver 89 can now lift headrest 18 upwardly away from seat bottom 21 or lower headrest 18 downwardly along seat back 22 toward seat bottom 21.

Headrest 18 is shown in a raised position on seat back 22 in FIG. 7. The hand 89A of the caregiver 89 has been removed from PUSH handle 78 of actuator 74 to allow a return spring 77S included in headrest lock 70 and coupled to PUSH handle 78 to pivot release lever 76 about pivot axis 71A in a clockwise direction 104 to urge headrest-retainer rod 73 into contact with rod receiver 72 and, for example, into rod-receiving notches 75 formed in notched plates 74 to establish a normally engaged position of headrest-retainer rod 73 and thereby block up-and-down movement of movable headrest 18 relative to seat bottom 21 and along seat back 22.

Figure 3C:
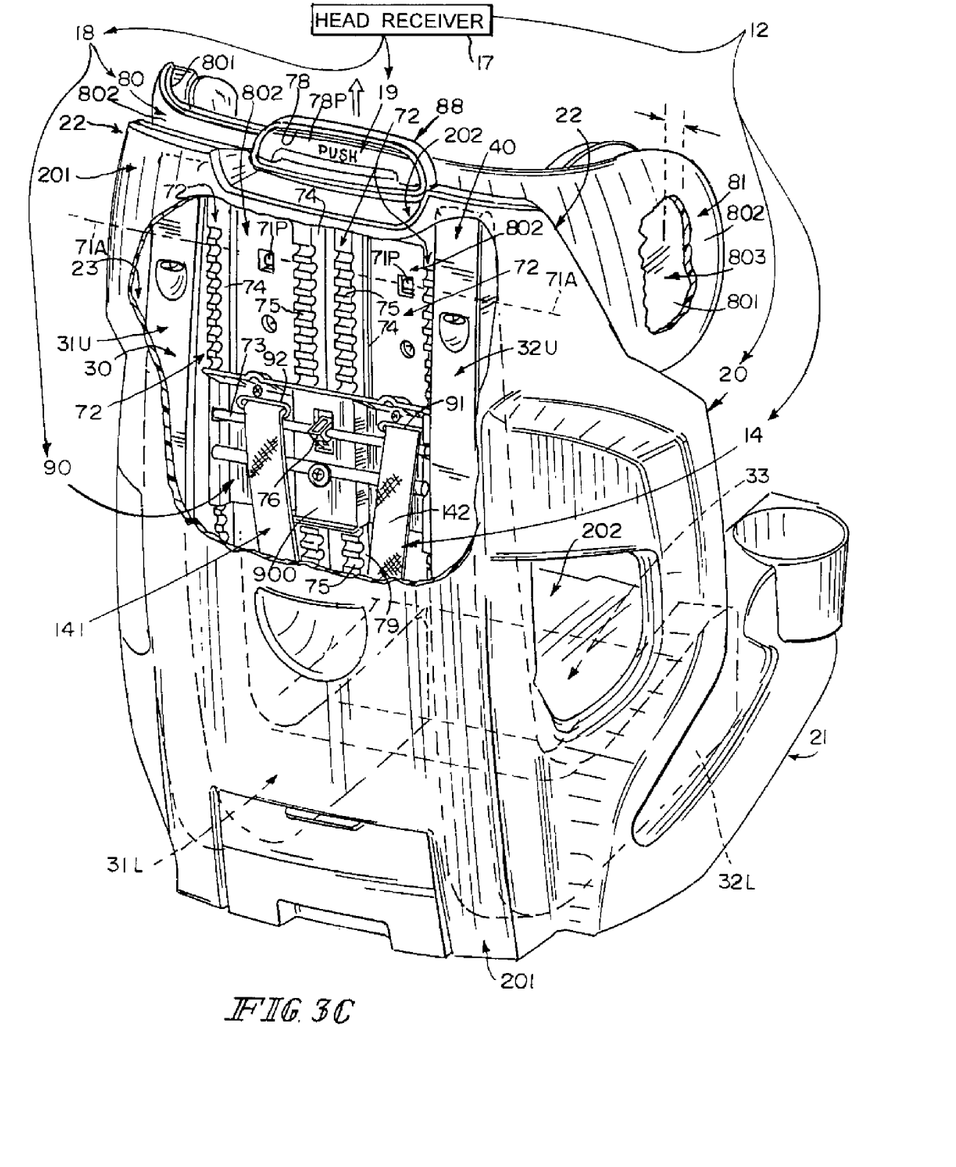
FIG. 3C is an enlarged rear view of the child restraint of FIG. 1 with a rear portion of the seat shell removed to show a portion of the slidable cradle retainer included in the headrest coupled to first and second shoulder belts included in the child-restraint harness and mounted for up-and-down movement on the rigidifying truss mounted inside the hollow seat shell to raise and lower the head cradle located on a front side of the seat back above the seat bottom.

Hollow seat shell 20 includes a bottom shell portion 201 and a top shell portion 202 in illustrative embodiments as suggested in FIGS. 1 and 3. Top shell portion 202 is coupled to bottom shell portion 201 to form interior region 23 therebetween. A bottom cavity 23L of interior region 23 is formed in seat bottom 21 when bottom and top shell portions 201, 202 are mated. A back cavity 23U of interior region 23 is formed in seat back 22 to communicate with bottom cavity 23L and to provide a space large enough to contain rigidifying truss 30 therein when bottom and top shell portions 201, 202 are mated. Rigidifying truss 30 is a modular component configured to be mounted in interior region 23 of hollow seat shell 20 to rigidify seat shell 20 and is shown, for example, in FIG. 4.

Upper stabilizer 34 of rigidifying truss 30 includes an upper panel 34U and a lower panel 34L as shown for example in FIG. 2. Upper panel 34U is formed to include a pair of upwardly extending and laterally spaced-apart belt-travel channels 341, 342 as shown, for example, in FIG. 3A. Each of the belt-travel channels 341, 342 is configured to provide means for receiving therein a shoulder belt 141, 142 included in a child-restraint harness 14 coupled to juvenile seat 12.

Rod receiver 72 is coupled to a rear portion of upper panel 34U of upper stabilizer 34 and arranged to extend away from backrest 202U of top shell portion 202 as suggested in FIGS. 1 and 4. Rod receiver 72 includes one or more notched plates 74 formed to include a series of rod-receiving notches 75 having openings facing away from backrest 202U of top shell portion 202 and toward back frame 201U of bottom shell portion 201 as suggested in FIG. 4. Each rod-receiving notch 75 formed in notched plate 74 is located at a different elevation above seat bottom 21.

Upper panel 34U of upper stabilizer 34 is formed to include a pair of upwardly extending and laterally spaced-apart belt-travel channels 341, 342 shown, for example, in FIG. 3A. These belt-travel channels 341, 342 are provided so that shoulder belts 141, 142 in child-restraint harness 14 can pass between front and rear sides of seat shell 20 and front and rear faces 34F, 34R of upper stabilizer 34. A first glide block 93 is arranged to extend into and move in the first belt-travel channel 341 and a second glide block 94 is arranged to extend into and move in the second belt-travel channel 342. Headrest 18 is aligned with seat back 22 so that belt-receiving slots 181, 182 formed in head cradle 80 and belt-receiving slots 91, 92 formed in slidable cradle retainer 90 of headrest 18 are always aligned with belt-travel channels 341, 342 formed in upper panel 34U of upper stabilizer 34 regardless of the elevation position of headrest 18 on seat back 22. Backrest 202U of top shell portion 202 is formed to include an aperture (not shown) aligned to communicate with belt-travel channel 341, 342.

A first shoulder belt 141 included in child-restraint harness 14 is arranged to extend through first belt-travel channel 341. First shoulder belt 141 is also arranged to extend through a first shoulder belt-receiving slot 181 formed in head cradle 80 of headrest 18 and through a first shoulder belt-receiving slot 91 formed in slidable cradle retainer 90 of headrest 18.

A second shoulder belt 142 included in child-restraint harness 14 is arranged to extend through second belt-travel channel 342. Second shoulder belt 142 is also arranged to extend through a second shoulder belt-receiving slot 182 formed in head cradle 80 of headrest 18 and through a second shoulder belt-receiving slot 92 formed in slidable cradle retainer 90 of headrest 18.

Head cradle 80 of headrest 18 includes a harness-control unit 83 formed to include first and second belt-receiving slots 181, 182. Head cradle 80 also includes a first side wing 81 coupled to one side of harness-control unit 83 and a second side wing 82 coupled to another side of harness-control unit 83 as suggested in FIG. 2. Illustratively, a head of a child seated on juvenile seat 12 is positioned to lie between first and second side wings 81, 82 on harness-control unit 83.

Headrest 18 is mounted for up-and-down movement on upper stabilizer 34 and relative to seat back 22 of seat shell 20. The first and second shoulder belt-receiving slots 181, 182 of harness-control unit 83 of head cradle 80 and the first and second shoulder belt-receiving slots 91, 92 formed in slidable cradle retainer 90 are aligned with their companion belt-travel channels 341, 342 formed in upper stiffener 34 of rigidifying truss 30. Shoulder belt-receiving slots 181, 182 formed in head cradle 80 and shoulder belt-receiving slots 91, 92 formed in slidable cradle-retainer plate 90 operate to keep the shoulder belts 141, 142 that are carried on headrest-retainer rod 73 positioned at an appropriate height that corresponds to the vertical position of headrest 18 relative to seat back 22.

Child-restraint harness 14 is used to restrain a child sitting on seat shell 20. Child-restraint harness 14 in an illustrative embodiment is configured to include shoulder belts 141, 142, a crotch belt 143, and thigh-restraint belts (not shown). Belt-travel channels 341, 342 formed in rigidifying truss 30 allow shoulder belts 141, 142 to move with headrest 18 along the length of seat back 22 between raised and lowered positions.

Release lever 76 is mounted for pivotable movement on actuator support 79 relative to head cradle 80 about a horizontal pivot axis 71A in response to application of a pivot-inducing force to release lever 76 by a caregiver 89 to move headrest-retainer rod 73 in a direction away from the rear portion of upper stabilizer 34 and relative to rod receiver 72 from the locked position to the unlocked position. Release lever 76 includes a pivot mount 761, a handle support 762, and a rod mover 763 as shown, for example, in FIGS. 3A and 3B. Handle support 762 is coupled to PUSH handle 78 and pivot mount 761. Rod mover 763 is coupled to handle support 762 and headrest-retainer rod 73.

Pivot mount 761 includes pivot posts 761L, 761R intersecting horizontal pivot axis 71A and extending into companion post receivers 79L, 79R formed in actuator support 79 for rotative bearing engagement therein and pivotable movement about horizontal pivot axis 71A. Handle support 762 is arranged to interconnect PUSH handle 78 and rod mover 763. Handle support 762 is coupled to pivot posts 761L, 761R for teeter-totter pivoting movement about pivot axis 71A. An upper portion of handle support 762 extends upwardly from pivot posts 761L, 761R to handle 78 while a lower portion of handle support 762 extends downwardly from pivot posts 761L, 761R to rod mover 763 as shown, for example, in FIG. 3B.

PUSH handle 78 is arranged to move relative to the head cradle 80 during pivoting movement of release lever 76 about horizontal pivot axis 71A and configured to be gripped by a caregiver 89 pivoting release lever 76 about horizontal pivot axis 71A. Return spring 77S is coupled at a first end thereof to outer plate 801 of head cradle 80 and at an opposite second end thereof to PUSH handle 78. Return spring 77S is configured to provide means for yieldably urging headrest-retainer rod 73 in a direction toward the rear portion of upper stabilizer 34 and into a rod-receiving notch 75 formed in a notched plate 74 upon arrival of headrest-retainer rod 73 in a position confronting the rod-receiving notch once a caregiver lets go of release lever 76 to allow pivoting movement of release lever 76 about horizontal pivot axis 71A so as to retain headrest 18 in a selected one of the fixed positions on upper stabilizer 34 of rigidifying truss 30. Return spring 77S is arranged to lie in a space provided between outer plate 801 of head cradle 80 and handle 78.

Head cradle 80 is hollow and formed to include an interior region 803. Handle support 762 and most of rod mover 763 is arranged to lie in interior region 803 as suggested in FIG. 4. Handle 78 is arranged to lie outside of interior region 803 as also suggested in FIG. 4.

Head cradle 80 is formed to include a rearward-facing aperture 804 opening into interior region 803 as suggested in FIGS. 4 and 6. Handle 78 includes a finger-grip portion exposed in rearward-facing aperture 804 to be gripped by a caregiver and arranged to be moved toward outer plate 801 by a caregiver to cause release lever 76 to pivot about horizontal pivot axis 71A to compress return spring 77S and move headrest-retainer rod 73 from the locked position to the unlocked position as suggested in FIG. 5.

Child restraint 10 includes a juvenile seat 12, a headrest 18, and a headrest-height controller 19 as suggested in FIGS. 1, 2, and 3A. Juvenile seat 12 includes a seat bottom 21 and a seat back 22 extending upwardly from seat bottom 21 as suggested in FIG. 1. Headrest 18 is mounted for up-and-down movement on seat back 22 relative to seat bottom 21 as suggested in FIGS. 4-7. Headrest 18 includes a head cradle 80 located on a front side of seat back 22 and above seat bottom 21 and configured to receive the head of a child seated on seat bottom 21 as suggested in FIGS. 1, 3A, and 4. Headrest 18 also includes a cradle retainer 90 located on a rear side of seat back 22 and coupled to head cradle 80 to move up and down therewith relative to seat back 22 as suggested in FIGS. 3A and 4.

Headrest-height controller 19 includes a headrest lock 70 and a headrest-lock release 71 as suggested in FIGS. 3A and 3B. Headrest lock 70 includes a rod receiver 72 coupled to seat back 22 and a movable headrest-retainer rod 73. Headrest-lock release 71 includes an actuator 77 arranged to extend through an interior region 803 formed in head cradle 80 to mate with the movable headrest-retainer rod 73. Actuator 77 is mounted for pivotable movement in interior region 803 of head cradle 80 about a pivot axis 71A to cause movement of headrest-retainer rod 73 from a locked position engaging rod receiver 72 coupled to seat back 22 to block up-and-down movement of headrest 18 on seat back 22 relative to seat bottom 21 to an unlocked position disengaging rod receiver 72 to free the headrest 18 for up-and-down movement on seat back 22 relative to seat bottom 21 as suggested in FIGS. 5 and 6.

Head cradle 80 includes an outer shell 801 arranged to face away from seat back 22 and an inner shell 802 arranged to face toward seat back 22 and coupled to outer shell 801 to form interior region 803 therebetween Inner shell 802 is formed to include a lower actuator-outlet port 77L opening into the interior region 803 of head cradle 80. Headrest-retainer rod 73 is located outside of the interior region of head cradle 80 and adjacent to rod receiver 72. Actuator 77 is arranged to extend through lower actuator-outlet port 77L to mate with headrest-retainer rod 73 and move in lower actuator-outlet port 77L relative to inner shell 802 during movement of headrest-retainer rod 73 relative to inner shell 802 and rod receiver 73 between the locked and unlocked positions.

Actuator 77 includes a release lever 76 and a push handle 78 as shown, for example, in FIGS. 3A and 3B. Release lever 76 is mounted for pivotable movement about pivot axis 71A and arranged to extend through lower actuator-outlet port 77L to mate with headrest-retainer rod 73. Push handle 78 is coupled to an upper portion of release lever 76.

Head cradle 80 further includes a palm-grip shell 88 formed to include an upper actuator-outlet port 77L opening into interior region 803 of head cradle 80. Push handle 78 of actuator 77 is arranged to extend through upper actuator-outlet port 77L as suggested in FIG. 3 and shown, for example, in FIGS. 4-7. Palm-grip shell 88 is coupled to inner shell 802 to lie adjacent to the upper portion of release lever 76 and arranged to extend upwardly away from seat bottom 21 and above the upper edge 801U of outer shell 801 as suggested in FIG. 1.

Palm-grip shell 88 is configured to provide means for supporting a palm 90P of a hand 90H of a user 90 to position fingers 90F on that hand 90H in engagement with a portion 78P of push handle 78 that lies outside of interior region 803 of head cradle 80 as suggested in FIG. 5 so that release lever 76 pivots about pivot axis 71A to cause movement of headrest-retainer rod 73 from the locked position to the unlocked position in response to application of a pushing force $F_p$ by (see FIG. 3B) the user 90 to push handle 78 in a direction 101 toward outer shell 801 using the fingers 90F engaging push handle 78. Palm-grip shell of head cradle 80 and push handle 78 of actuator 77 cooperate to form grip-handle means adapted to be gripped by a caregiver 89 for raising and lowering headrest 18 relative to seat bottom 21 upon movement of headrest-retainer rod 73 to the unlocked position in response to pivoting movement of release lever 76 about pivot axis 71A.

Headrest-lock release 76 further includes an actuator support 79 located in interior region 803 of the head cradle. Actuator support 79 is coupled to head cradle 80 and to release lever 76 of actuator 77 to provide means for supporting release lever 76 for pivotable movement about pivot axis 71A relative to inner and outer shells 802, 801 of head cradle 80 to cause movement of headrest-retainer rod 73 between the locked and unlocked positions.

Headrest-lock release 71 further includes a return spring 77S coupled at a first end thereof to outer shell 801 and at a second end thereof to push handle 78 of actuator 77 as suggested in FIGS. 3A, 3B, and 4. Return spring 77S is configured to provide means for pivoting release lever 76 about pivot axis 71A to urge yieldably headrest-retainer rod 73 to the locked position as suggested in FIG. 4.

Inner shell 802 includes a first shoulder belt-receiving slot 181 and a second shoulder belt-receiving slot 182 arranged to lie in spaced-apart relation to first shoulder belt-receiving slot 181 to locate the lower actuator-outlet port 77L therebetween as suggested in FIG. 2. Child restraint 10 also includes a child-restraint harness 14 including a first shoulder belt 141 passing through first shoulder belt-receiving slot 181 and a second shoulder belt 142 passing through second shoulder belt-receiving slot 182.

Outer shell 801 includes a first shoulder belt-receiving slot 181 aligned with the first shoulder belt-receiving slot 181 of inner shell 802 and a second shoulder belt-receiving slot 182 aligned with second shoulder belt-receiving slot 182 of inner shell 802. First shoulder belt 141 passes through the first shoulder belt-receiving slot 181 of outer shell 801. Second shoulder belt 142 passes through the second shoulder belt-receiving slot 182 of outer shell 801.

Release lever 76 of actuator 77 includes a handle support 762 and a rod mover 763 as shown, for example, in FIG. 3B. Handle support 762 is located in the interior region 803 of head cradle 80 and arranged to pivot about pivot axis 71A. Rod mover 763 is coupled to a lower end of handle support 762 and arranged to extend through lower actuator-outlet 77L to mate with headrest-retainer rod 73 and to move in lower actuator-outlet port 77L during pivoting movement of handle support 762 about pivot axis 71A. Push handle 78 is coupled to an upper end of handle support 762 to locate pivot axis 71A between push handle 78 and rod mover 763 and configured to have a finger-contact plate 78P located outside of the interior region 803 of head cradle 80. Handle support 762 is configured to provide means for moving rod mover 763 away from outer shell 801 to cause headrest-retainer rod 73 to move away from outer shell 801 from the locked position to the unlocked position in response to application of a pushing force $F_P$ to the finger-contact plate 78P of push handle 78 in a forward direction toward inner shell 802 as suggested in FIG. 5.

Rod mover 763 is configured to extend in a rearward direction away from the lower end of handle support 762 and outer shell 801 and through lower actuator-outlet port 77L to reach headrest-retainer rod 73. Push handle 78 is configured to extend in a rearward direction away from the upper end of handle support 762 and outer shell 801 and through upper actuator-outlet port 77U to locate the finger-contact plate 78P outside of the interior region 803 of head cradle 80. Return spring 77S is arranged to act between head cradle 80 and the finger-contact plate 78P to provide means for applying a force to the finger-contact plate 78P yieldably to pivot handle support 762 about pivot axis 71A to move rod mover 763 in lower actuator-outlet port 77L so that headrest-retainer rod 73 is moved from the unlocked position to the locked position.

Finger-contact plate 78P of push handle 78 includes an inner portion facing in a forward direction toward the interior region 803 of head cradle 80. Inner shell 802 includes an outer portion facing in an opposite rearward direction away from interior region 803 of head cradle 80 and toward the inner portion of finger-contact plate 78P. Return spring 77S is located between and arranged to act against the inner portion of the finger-contact plate 78P and the outer portion of outer shell 801 to provide means for yieldably urging finger-contact plate 78P away from inner shell 802 to pivot release lever 76 about pivot axis 71A so that headrest-retainer rod 73 is moved from the unlocked position to the locked position. Return spring 77S is located outside of interior region 803 of head cradle 80. Return spring 77S is a coiled compression spring having a first end engaging the inner portion of finger-contact plate 78P and an opposite secured end engaging the outer portion of inner shell 802.

Head cradle 80 includes a harness-control unit 83 having a head pad 83H and a belt pad 83B coupled to head pad 83H to move therewith as suggested in FIG. 2, a first side wing 81 coupled to a first side of head pad 83H and arranged to extend at an angle away from head pad 83H, and a second side wing 81 coupled to an opposite second side of head pad 83H to locate head pad 83A between first and second side wings 81, 82. Second side wing 82 is arranged to extend at an angle away from head pad 83H and in diverging relation to first side wing 81 to define a space located between first and second side wings 81, 82 and adapted to receive the head of a child seated on seat bottom 21. Each of head pad 83H and first and second side wings 81, 82 is hollow to define the interior region of head cradle 80.

Belt pad 83B of harness-control unit 83 is formed to include a first shoulder belt-receiving slot 181 and a second shoulder belt-receiving slot 182 as suggested in FIG. 2. Actuator 77 is located in a portion of the interior region 803 located in head pad 83H. Child-restraint harness 14 includes a first shoulder belt 141 extending through the first shoulder belt-receiving slot 181 formed in belt pad 83B and a second shoulder belt 142 extending through the second shoulder belt-receiving slot 182 formed in belt pad 83B.

The invention claimed is:

1. A child restraint comprising
a juvenile seat including a seat bottom and a seat back extending upwardly from the seat bottom,
a headrest mounted for up-and-down movement on the seat back relative to the seat bottom, the headrest including a head cradle located on a front side of the seat back and above the seat bottom and configured to receive the head of a child seated on the seat bottom, and
a headrest-height controller including a headrest lock and a headrest-lock release, wherein the headrest lock includes a rod receiver coupled to the seat back and a movable headrest-retainer rod, the headrest-lock release includes an actuator arranged to extend through an interior region formed in the head cradle to mate with the movable headrest-retainer rod, and the actuator is mounted for pivotable movement in the interior region of the head cradle about a pivot axis to cause movement of the headrest-retainer rod from a locked position engaging the rod receiver coupled to the seat back to block up-and-down movement of the headrest on the seat back relative to the seat bottom to an unlocked position disengaging the rod receiver to free the headrest for up-and-down movement on the seat back relative to the seat bottom,
wherein the head cradle includes an outer shell arranged to face away from the seat back and an inner shell arranged to face toward the seat back and coupled to the outer shell to form the interior region therebetween, the inner shell is formed to include a lower actuator-outlet port opening into the interior region of the head cradle, the headrest-retainer rod is located outside of the interior region of the head cradle and adjacent to the rod receiver, and the actuator is arranged to extend through the lower actuator-outlet port to mate with the headrest-retainer rod and move in the lower actuator-outlet port relative to the inner shell during movement of the headrest-retainer rod relative to the inner shell and the rod receiver between the locked and unlocked positions, and
wherein the inner shell includes a first shoulder belt-receiving slot and a second shoulder belt-receiving arranged to lie in spaced-apart relation to the first shoulder belt-receiving slot to locate the lower actuator-outlet port therebetween and further comprising a child-restraint harness including a first shoulder belt passing through the first shoulder belt-receiving slot and a second shoulder belt passing through the second shoulder belt-receiving slot.

2. The child restraint of claim 1, wherein the actuator includes a release lever mounted for pivotable movement about the pivot axis and arranged to extend through the lower actuator-outlet port to mate with the headrest-retainer rod and a push handle coupled to an upper portion of the release lever, the head cradle further includes a palm-grip shell formed to include an upper actuator-outlet port opening into the interior region of the head cradle, the push handle of the actuator is arranged to extend through the upper actuator-outlet port, and the palm-grip shell is coupled to the inner shell to lie adjacent to the upper portion of the release lever and arranged to extend upwardly away from the seat bottom and above the upper edge of the outer shell to provide means for supporting a palm of a hand of a user to position fingers on that hand in engagement with a portion of the push handle that lies outside of the interior region of the head cradle so that the release lever pivots about the pivot axis to cause movement of the headrest-retainer rod from the locked position to the unlocked position in response to application of a pushing force by the user to the push handle in a direction toward the outer shell using the fingers engaging the push handle.

3. The child restraint of claim 2, wherein the headrest-lock release further includes an actuator support located in the interior region of the head cradle and coupled to the head cradle and to the release lever of the actuator to provide means for supporting the release lever for pivotable movement about the pivot axis relative to the inner and outer shells of the head cradle to cause movement of the headrest-retainer rod between the locked and unlocked positions.

4. The child restraint of claim 2, wherein the palm-grip shell of the head cradle and the push handle of the actuator cooperate to form grip-handle means adapted to be gripped by a caregiver for raising and lowering the headrest relative to the seat bottom upon movement of the headrest-retainer rod to the unlocked position in response to pivoting movement of the release lever about the pivot axis.

5. The child restraint of claim 2, wherein the headrest-lock release further includes a return spring coupled at a first end thereof to the outer shell and at a second end thereof to the push handle of the actuator and configured to provide means for pivoting the release lever about the pivot axis to urge yieldably the headrest-retainer rod to the locked position.

6. The child restraint of claim 1, wherein the outer shell includes a first shoulder belt-receiving slot aligned with the first shoulder belt-receiving slot of the inner shell and a second shoulder belt-receiving slot aligned with the second shoulder belt-receiving slot aligned with the second shoulder belt-receiving slot of the inner shell, the first shoulder belt passes through the first shoulder belt-receiving slot of the outer shell, and the second shoulder belt passes through the second shoulder belt-receiving slot of the outer shell.

7. The child restraint of claim 1, wherein the actuator includes a handle support located in the interior region of the head cradle and arranged to pivot about the pivot axis, a rod mover coupled to a lower end of the handle support and arranged to extend through the lower actuator-outlet to mate with the headrest-retainer rod and to move in the lower actuator-outlet during pivoting movement of the handle support about the pivot axis, and a push handle coupled to an upper end of the handle support to locate the pivot axis between the push handle and the rod mover and configured to have a finger-contact plate located outside of the interior region of the head cradle.

8. The child restraint of claim 7, wherein the handle support is configured to provide means for moving the rod mover away from the outer shell to cause the headrest-retainer rod to move away from the outer shell from the locked position to the unlocked position in response to application of a pushing force to the finger-contact plate of the push handle in a forward direction toward the inner shell.

9. The child restraint of claim 7, wherein the rod mover is configured to extend in a rearward direction away from the lower end of the handle support and the outer shell and through the lower actuator-outlet port to reach the headrest-retainer rod and the push handle is configured to extend in a rearward direction away from the upper end of the handle support and the outer shell and through the upper actuator-outlet port to locate the finger-contact plate outside of the interior region of the head cradle.

10. The child restraint of claim 9, wherein the headrest-lock release further includes a return spring arranged to act between the head cradle and the finger-contact plate to provide means for applying a force to the finger-contact plate yieldably to pivot the handle support about the pivot axis to move the rod mover in the lower actuator-outlet port so that the headrest-retainer rod is moved from the unlocked position to the locked position.

11. The child restraint of claim 7, wherein the finger-contact plate includes an inner portion facing in a forward direction toward the interior region of the head cradle, the inner shell includes an outer portion facing in an opposite rearward direction away from the interior region of the head cradle and toward the inner portion of the finger-contact plate, and a headrest-lock release further includes a return spring located between and arranged to act against the inner portion of the finger-contact plate and the outer portion of the inner shell to provide means for yieldably urging the finger-contact plate away from the inner shell to pivot the release lever about the pivot axis so that the headrest-retainer rod is moved from the unlocked position to the locked position.

12. The child restraint of claim 11, wherein the return spring is located outside of the interior region of the head cradle.

13. The child restraint of claim 11, wherein the return spring is a coiled compression spring having a first end engaging the inner portion of the finger-contact plate and an opposite secured end engaging the outer portion of the inner shell.

14. A child restraint comprising
a juvenile seat including a seat bottom and a seat back extending upwardly from the seat bottom,
a headrest mounted for up-and-down movement on the seat back relative to the seat bottom, the headrest including a head cradle located on a front side of the seat back and above the seat bottom and configured to receive the head of a child seated on the seat bottom, and
a headrest-height controller including a headrest lock and a headrest-lock release, wherein the headrest lock includes a rod receiver coupled to the seat back and a movable headrest-retainer rod, the headrest-lock release includes an actuator arranged to extend through an interior region formed in the head cradle to mate with the movable headrest-retainer rod, and the actuator is mounted for pivotable movement in the interior region of the head cradle about a pivot axis to cause movement of the headrest-retainer rod from a locked position engaging the rod receiver coupled to the seat back to block up-and-down movement of the headrest on the seat back relative to the seat bottom to an unlocked position disengaging the rod receiver to free the headrest for up-and-down movement on the seat back relative to the seat bottom,
wherein the head cradle includes a harness-control unit having a head pad and a belt pad coupled to the head pad to move therewith, a first side wing coupled to a first side of the head pad and arranged to extend at an angle away from the head pad, and a second side wing coupled to an opposite second side of the head pad to locate the head pad between the first and second side wings and arranged to extend at an angle away from the head pad and in diverging relation to the first side wing to define a space located between the first and second side wings and adapted to receive the head of a child seated on the seat bottom and wherein each of the head pad and first and second side wings is hollow to define the interior region of the head cradle, and
wherein the belt pad is formed to include a first shoulder belt-receiving slot and a second shoulder belt-receiving slot, the actuator is located in a portion of the interior region located in the head pad, and further comprising a child-restraint harness including a first shoulder belt extending through the first shoulder belt-receiving slot formed in the belt pad and a second shoulder belt extending through the second shoulder belt-receiving slot formed in the belt pad.

15. A child restraint comprising
a juvenile seat including a seat bottom and a seat back extending upwardly from the seat bottom,
a headrest mounted for up-and-down movement on the seat back relative to the seat bottom, the headrest including a head cradle located on a front side of the seat back and above the seat bottom and configured to receive the head of a child seated on the seat bottom, and
a headrest-height controller including a headrest lock and a headrest-lock release, wherein the headrest lock includes a rod receiver coupled to the seat back and a movable headrest-retainer rod, the headrest-lock release includes an actuator arranged to extend through an interior region formed in the head cradle to mate with the movable headrest-retainer rod, and the actuator is mounted for pivotable movement in the interior region of the head cradle about a pivot axis to cause movement of the headrest-retainer rod from a locked position engaging the rod receiver coupled to the seat back to block up-and-down movement of the headrest on the seat back relative to the seat bottom to an unlocked position disengaging the rod receiver to free the headrest for up-and-down movement on the seat back relative to the seat bottom,
wherein the seat bottom and seat back cooperate to define a hollow seat shell, and further comprising a rigidifying truss located in an interior region formed in the hollow seat shell and coupled to the hollow seat shell to lie in a stationary position in the interior region, and wherein the headrest is mounted for up-and-down movement on the rigidifying truss relative to the seat back, the headrest-height controller is arranged to adjust the height of the headrest on the rigidifying truss relative to the seat bottom, the rod receiver is coupled to the rigidifying truss and located in the interior region of the hollow seat shell, the headrest-retainer rod is arranged to lie and move in the interior region of the hollow seat shell relative to the rod receiver between the locked position engaging the rod receiver to retain the headrest in a selected position on the rigidifying truss to establish the elevation of the headrest above the seat bottom and the unlocked position disengaging the rod receiver to free the headrest for up-and-down movement relative to the rigidifying truss and the seat back to establish a new elevation of the headrest above the seat bottom, and
further comprising a child-restraint harness coupled to the juvenile seat and configured to restrain a child seated on the seat bottom, the child-restraint harness includes first and second shoulder belts arranged to pass through shoulder belt-receiving slots formed in the head cradle to move up and down therewith relative to the seat bottom, the headrest further includes a slidable cradle retainer located on a back side of the seat back and coupled to the head cradle to move therewith during up-and-down movement of the headrest on the rigidifying truss relative to the seat back, the slidable cradle retainer is formed to include the first load-transfer flange and is coupled to the first and second shoulder belts, and the slidable cradle retainer is configured to provide means for transferring loads applied by the first and second shoulder belts to the slidable cradle retainer in response to movement of the seated child relative to the juvenile seat to tension the first and second shoulder belts during exposure of a vehicle carrying the juvenile seat to an external impact to the rigidifying truss via a load-transfer path established by mating engagement of the first load-transfer flange on the head cradle and the first load-receiver rail on the rigidifying truss.

16. The child restraint of claim 15, wherein the rigidifying truss is formed to include upwardly extending and laterally spaced-apart first and second belt-travel channels, the cradle retainer includes a first glide block arranged to extend into and move in the first belt-travel channel during up-and-down movement of the headrest relative to the rigidifying truss and formed to include a first belt-receiving slot and a second glide block arranged to extend into and move in the second belt-travel channel during up-and-down movement of the headrest relative to the rigidifying truss, the first shoulder belt is arranged to pass through each of the first belt-receiving slot of the first glide block and first belt-travel channel, and the second shoulder belt is arranged to pass through each of the second belt-receiving slot of the second glide block and the second belt-travel channel and the cradle retainer further includes a web arranged to lie between and interconnect first and second glide blocks, the web is formed to include a lever-receiving aperture, and the actuator is coupled to the head cradle to move therewith and is arranged to extend through the lever-receiving aperture formed in the web and coupled to the headrest-retainer rod, and the release lever is supported for pivotable movement about the pivot axis and in the lever-receiving aperture to move the headrest-retainer rod relative to the rod receiver.

17. The child restraint of claim 15, wherein the rigidifying truss includes a first stiffener beam, a second stiffener beam arranged to lie in laterally spaced-apart relation to the first stiffener beam, and an upper beam stabilizer located in a back cavity of the interior region formed in the seat back and arranged to interconnect the first and second stiffener beams to retain the first and second stiffener beams in fixed relation to one another and wherein the rod receiver is coupled to the upper beam stabilizer.

18. The child restraint of claim 17, wherein the rod receiver includes a notched plate coupled to the upper beam stabilizer and formed to include a series of rod-receiving notches having openings facing away from a head cradle included in the headrest and arranged to lie on a front side of the seat back above the seat bottom, each rod-receiving notch is located at a different elevation above the seat bottom, and the headrest retainer rod is arranged to move relative to the rod receiver and the upper beam stabilizer and the hollow seat shell in the interior region of the hollow seat shell to engage a selected first of the rod-receiving notches in the locked position to establish a first elevation of the headrest above the seat bottom and to engage a selected second of the rod-receiving notches in the locked position to establish a different second elevation of the headrest above the seat bottom and to disengage the rod-receiving notches formed in the notched plate in the unlocked position.

19. The child restraint of claim 15, wherein the head cradle is a hollow head cradle and the juvenile seat is formed to include a lower actuator-outlet port and an upper actuator-outlet port and the headrest-height controller further includes an actuator support coupled to the juvenile seat and located in the interior region formed in the hollow head cradle and the actuator includes a release lever mounted on the actuator support for pivotable movement about a pivot axis and arranged to extend through the lower actuator-outlet port to mate with the headrest-retainer rod and a push handle coupled to the release lever and arranged to extend through the upper actuator-outlet to a location outside of the interior region formed in the hollow head cradle to provide means outside of an interior region of the hollow head cradle for receiving a pushing force applied by a caregiver to cause the release lever to pivot about a pivot axis so that the headrest-retainer rod is moved from the locked position to the unlocked position.

20. The child restraint of claim 19, wherein the headrest-height controller further includes a return spring located outside of the interior region of the hollow head cradle and configured to provide means for yieldably urging the push handle away from the head cradle to cause the release lever to pivot about the pivot axis normally to move the headrest-retainer rod to the locked position.

21. The child restraint of claim 19, wherein the hollow head cradle includes an inner shell and an outer shell coupled to the inner shell to form the interior region, the inner shell is located between a seat back of the juvenile seat and the outer shell, and the inner shell is formed to include the lower actuator-outlet port.

* * * * *